(12) United States Patent
Pudvah et al.

(10) Patent No.: US 10,253,646 B2
(45) Date of Patent: Apr. 9, 2019

(54) VANE ARM ASSEMBLY

(71) Applicant: UNITED TECHNOLOGIES CORPORATION, Hartford, CT (US)

(72) Inventors: Bernard W. Pudvah, Portland, CT (US); Eugene C Gasmen, Rocky Hill, CT (US); Christopher St. Mary, Hebron, CT (US); Stanley Wiecko, Newington, CT (US)

(73) Assignee: United Technologies Corporation, Farmington, CT (US)

( * ) Notice: Subject to any disclaimer, the term of this patent is extended or adjusted under 35 U.S.C. 154(b) by 491 days.

(21) Appl. No.: 14/913,043

(22) PCT Filed: Jun. 4, 2014

(86) PCT No.: PCT/US2014/040814
§ 371 (c)(1),
(2) Date: Feb. 19, 2016

(87) PCT Pub. No.: WO2015/026420
PCT Pub. Date: Feb. 26, 2015

(65) Prior Publication Data
US 2016/0201499 A1 Jul. 14, 2016

Related U.S. Application Data

(60) Provisional application No. 61/868,738, filed on Aug. 22, 2013.

(51) Int. Cl.
| F01D 17/14 | (2006.01) |
| F16B 21/16 | (2006.01) |
| F16H 51/00 | (2006.01) |
| F01D 9/04 | (2006.01) |
| F04D 29/54 | (2006.01) |
| F04D 29/56 | (2006.01) |

(Continued)

(52) U.S. Cl.
CPC ............. *F01D 17/14* (2013.01); *F01D 9/041* (2013.01); *F01D 17/162* (2013.01); *F04D 29/542* (2013.01); *F04D 29/563* (2013.01); *F04D 29/644* (2013.01); *F16B 21/16* (2013.01); *F16H 51/00* (2013.01); *F05D 2220/32* (2013.01)

(58) Field of Classification Search
CPC ......... F01D 17/14; F01D 17/162; F16B 21/16
See application file for complete search history.

(56) References Cited

U.S. PATENT DOCUMENTS 4,498,790 A   2/1985   Fisher
5,492,446 A   2/1996   Hawkins et al.
(Continued)

FOREIGN PATENT DOCUMENTS

EP   2 177 771 A2   4/2010
EP   2273074 B1     5/2012

OTHER PUBLICATIONS

European search report for application No. 14838674.1-1608 dated Aug. 16, 2016.

*Primary Examiner* — Jason D Shanske
*Assistant Examiner* — John S Hunter, Jr.
(74) *Attorney, Agent, or Firm* — Bachman & LaPointe, P.C.

(57) ABSTRACT

An assembly for operating a device, such as a variable vane, has an arm, a stem to which the arm is connected, the stem having a slot, and a member having a tab which fits into the slot.

14 Claims, 3 Drawing Sheets

(51) Int. Cl.
 *F04D 29/64* (2006.01)
 *F01D 17/16* (2006.01)

(56) References Cited

U.S. PATENT DOCUMENTS

| | | | |
|---|---|---|---|
| 6,209,198 B1* | 4/2001 | Lammas | F01D 17/162 |
| | | | 29/889.22 |
| 6,799,945 B2 | 10/2004 | Chatel et al. | |
| 7,448,848 B2 | 11/2008 | Alexander et al. | |
| 8,414,248 B2* | 4/2013 | Perez | F01D 17/162 |
| | | | 415/1 |
| 2003/0170115 A1 | 9/2003 | Bowen et al. | |
| 2005/0169741 A1 | 8/2005 | Kies et al. | |
| 2010/0166540 A1* | 7/2010 | Perez | F01D 17/162 |
| | | | 415/148 |

* cited by examiner

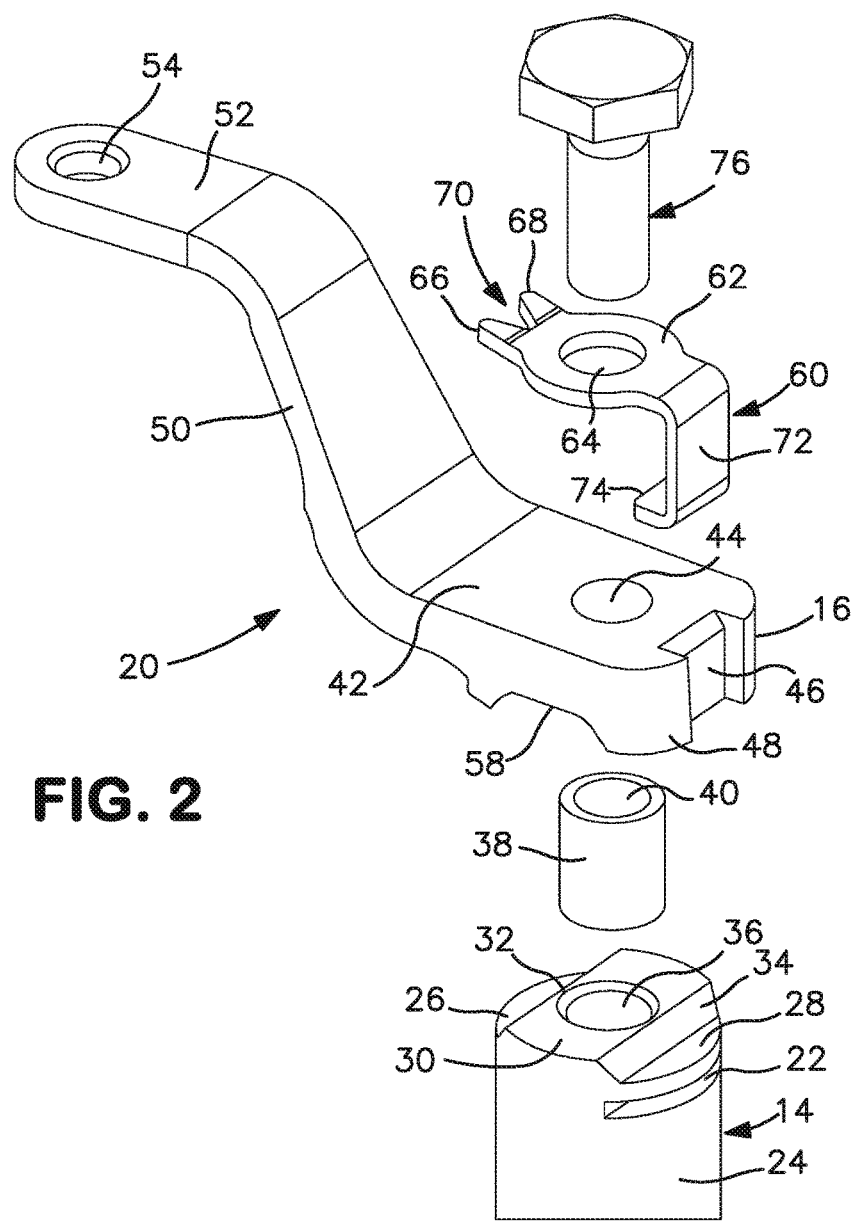
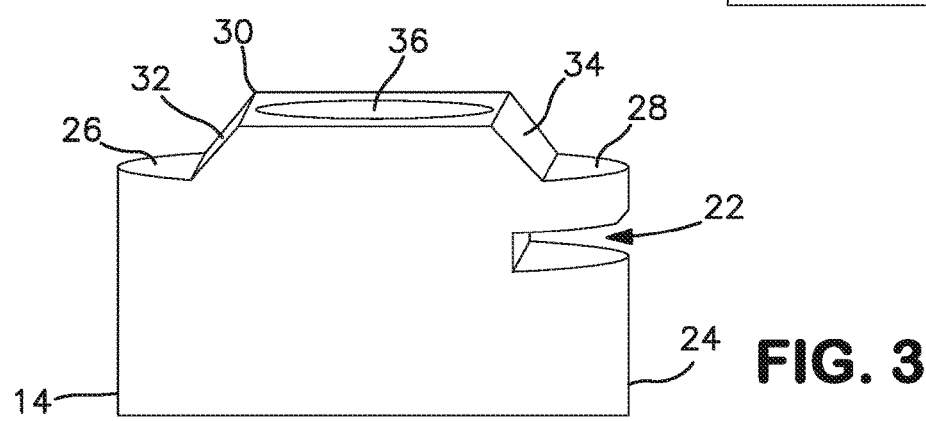

VANE ARM ASSEMBLY

BACKGROUND

The present disclosure relates to an arm assembly for operating a device such as a variable vane.

Variable vanes in gas turbine engines are connected to an arm assembly. In the past, prior engines used a stud with a flat as part of the vane arm assembly. However, despite the use of such a stud, there is still a need for a vane arm assembly which could be mistake proofed.

SUMMARY

In accordance with the present disclosure, there is provided an assembly for operating a device, which assembly broadly comprises an arm, a stem to which the arm is connected, the stem having a slot, and a member having a tab which fits into the slot.

In another and/or alternative embodiment, the member may have a first portion which overlaps the arm.

In another and/or alternative embodiment, an engagement device may be used to join the arm to the stem and the overlapping portion of the member may include an opening for receiving a portion of the engagement device.

In another and/or alternative embodiment, the overlapping portion may have two spaced apart projection members abutting a surface of the arm and a slot between the two spaced apart projection members.

In another and/or alternative embodiment, the member may have a second portion extending at a right angle to the first portion and connecting the first portion and the tab.

In another and/or alternative embodiment, the assembly may further comprise the arm having a slot and the second portion having a width so that the second portion fits within the slot.

In another and/or alternative embodiment, the stem may have an opening in a surface and the assembly may further comprise a threaded insert fitting into the opening.

In another and/or alternative embodiment, the stem may have angled surfaces and the arm may have a surface which mates with the angled surfaces.

In another and/or alternative embodiment, the slot may be in an end surface of the stem.

In another and/or alternative embodiment, the member may be a washer.

In another and/or alternative embodiment, the device may be a variable vane.

Further in accordance with the present disclosure, there is provided a vane arm assembly for a gas turbine engine which broadly comprises an arm, a vane having an integrally formed stem to which the arm is connected, the stem having a slot, and a member having a tab which fits into the slot.

In another and/or alternative embodiment, the member may have a first portion which overlaps the arm.

In another and/or alternative embodiment, the engagement device may be used to join the arm to the stem and the overlapping portion of the member may include an opening for receiving a portion of the engagement device.

In another and/or alternative embodiment, the overlapping portion may have two spaced apart projection members abutting a surface of the arm and a slot between the two spaced apart projection members.

In another and/or alternative embodiment, the member may have a second portion extending at a right angle to the first portion and connecting the first portion and the tab.

In another and/or alternative embodiment, the assembly may further comprise the arm having a slot and the second portion having a width so that the second portion fits within the slot.

In another and/or alternative embodiment, the stem may have an opening in a surface and the assembly may further comprise a threaded insert fitting into the opening.

In another and/or alternative embodiment, the stem may have angled surfaces and the arm may have a surface which mates with the angled surfaces.

In another and/or alternative embodiment, the slot may be in an end surface of the stem.

In another and/or alternative embodiment, the member may be a washer.

In another and/or alternative embodiment, the assembly may further comprise means for changing the position of the vane which changing means are connected to the arm.

Other details of the vane arm assembly are set forth in the following detailed description and the accompanying drawings wherein like reference numerals depict like elements.

BRIEF DESCRIPTION OF THE DRAWINGS

FIG. 2 is an exploded view of a vane arm actuation assembly in accordance with the present disclosure;

FIG. 3 is a side view of a vane stem; and

DETAILED DESCRIPTION

Figure 1:
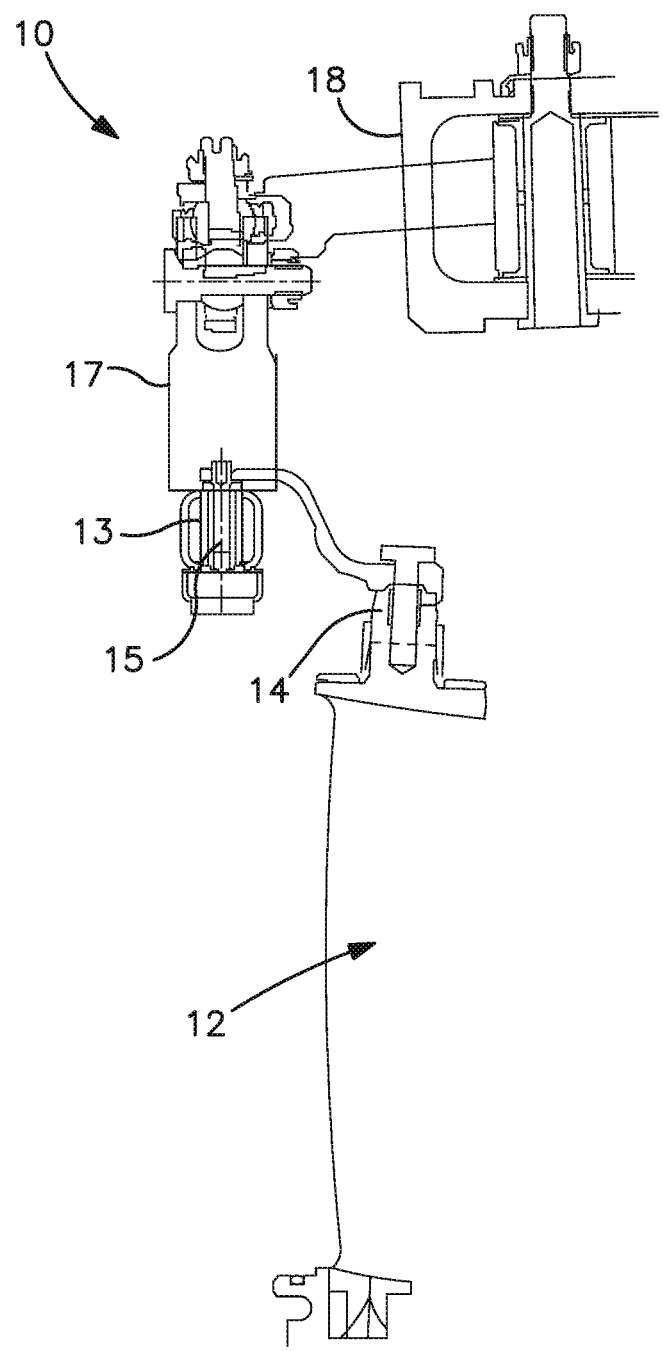
FIG. 1 is a schematic arrangement of a portion of a gas turbine engine and a system for operating a variable vane.

Referring now to the drawings, FIG. 1 illustrates a portion of a section 10 of a gas turbine engine, such as a compressor module. The portion shown illustrates an inlet guide vane 12 which may be movable. The inlet guide vane 12 has an integrally formed stem 14 to which an actuation arm 16 is attached. The actuation arm 16 may be further attached to a bushing 13 via a pin 15 which is rotatable. The bushing 13 may be part of a ring assembly 17 which is attached to a torque box assembly 18 and which together may form a means for changing the position of the vane 12. The ring assembly 17 is connected to a number of actuation arms 16 circumferentially around the section 10.

Referring now to FIG. 2, there is shown an exploded embodiment of a vane arm actuation assembly 20 in accordance with the present disclosure. The vane arm actuation assembly includes the integrally formed vane stem 14 and the actuation arm 16. As shown in FIGS. 2 and 3, the vane stem 14 has a slot 22 formed in an end portion 24 of the vane stem 14. The vane stem 14 also has a first planar surface 26, a second planar surface 28, a top surface 30, and two angled surfaces 32 and 34. The top surface 30 has an opening 36 for receiving a threaded insert 38 having a central opening 40.

The actuation arm 16 has a first planar portion 42 which has an opening 44 which aligns with the opening 40 in the threaded insert 38. The actuation arm 16 also has a slot 46 formed in an end surface 48. The actuation arm 16 further has an angled portion 50 which terminates in a second planar portion 52. The second planar portion 52 has an opening 54 for receiving a connection member, such as the pin 15, for joining the actuation arm 16 to the bushing 13. The underside 58 of the first planar portion is configured to mate with the surfaces 26, 28, 30, 32, and 34 of the stem 14.

The assembly 20 further includes a tab washer 60. The tab washer 60 has a first portion 62 which may be positioned over the first planar portion 42 of the actuation arm 16. The first portion 62 includes an opening 64 which aligns with the opening 44. The first portion 62 may have two spaced apart projection members 66 and 68 which abut a surface of the first planar portion 42. The spaced apart projection members 66 and 68 have an angled slot 70 between them. The washer 60 has a second portion 72 which may be at a right angle to the first portion 62. The second portion 72 has a width which allows the second portion 72 to fit into the slot 46 in the side of the actuation arm 16. The tab washer 60 further has a tab 74 which fits into the slot 22 in the stem 14. The tab 74 may extend substantially parallel to the first portion 62 and may be substantially perpendicular to the second portion 72.

Figure 4:
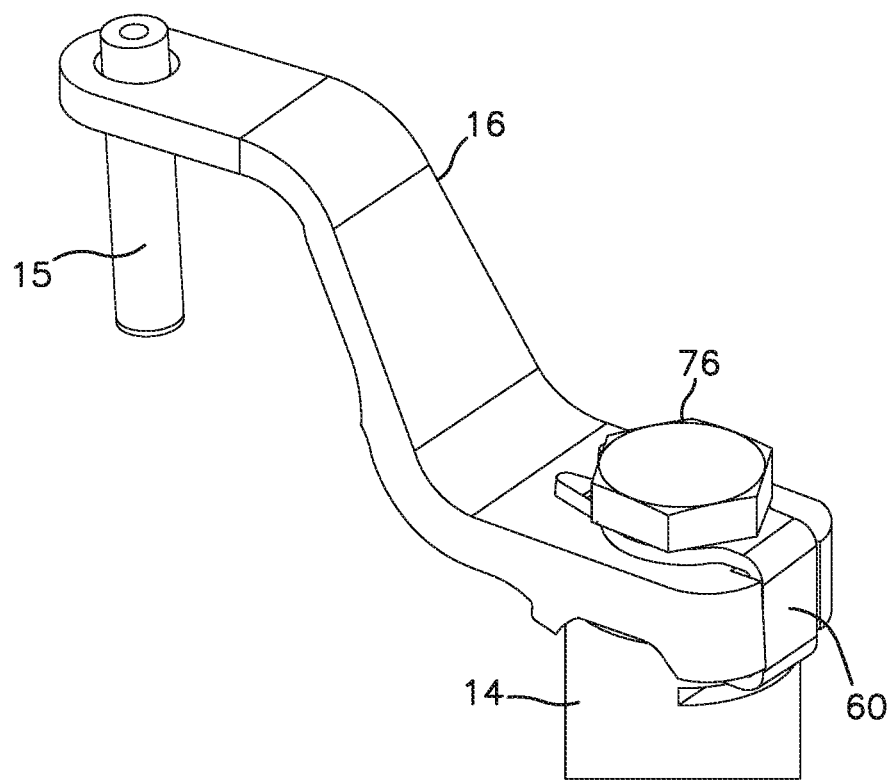
FIG. 4 is a view illustrating the assembled vane arm actuation assembly.

As shown in FIGS. 2 and 4, the vane stem 14, the actuation arm 16, and the washer 60 may be joined together by an engagement device 76 such as a bolt. When the vane arm assembly is assembled, the bolt 76 passes through the opening 64 and the opening 44 and into the opening 40 in the threaded insert 38.

The vane arm assembly described herein is a very simple, inexpensive configuration and mistake proof in its assembly. The custom washer 60 prevents the vane arm 16 from being misassembled.

The assembly described herein may be used in applications where mistake proof shaft to bellcrank attachments are needed. Thus, the assembly may be used in helicopter, automotive, and aeroplane chassis fields.

There has been provided herein a vane arm assembly. While the vane arm assembly has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. An assembly for operating a device, said assembly comprising:
   an actuation arm comprising a first planar portion adjacent an angled portion that terminates in a second planar portion, said actuation arm having an actuation arm slot formed in an end surface adjacent and orthogonal to said first planar portion;
   a stem to which said actuation arm is connected;
   said stem having a stem slot formed in said stem orthogonal to a stem top surface; and
   a tab washer having a tab washer first portion positioned over said first planar portion of said actuation arm, said tab washer having a tab washer second portion formed at a right angle to said tab washer first portion, a single tab extends from said tab washer second portion and inserts into said stem slot, said single tab being parallel to said tab washer first portion and perpendicular to said tab washer second portion.

2. The assembly of claim 1, wherein a bolt is used to join said actuation arm to said stem;
   and said tab washer first portion includes an opening for receiving a portion of said bolt, said tab washer first portion having two spaced apart projection members abutting said first planar portion of said actuation arm and said tab washer first portion having an angled slot between said two spaced apart projection members.

3. The assembly of claim 1, further comprising said tab washer second portion having a width so that said tab washer second portion fits within said actuation arm slot.

4. The assembly of claim 1, wherein said stem has an opening in said stem top surface and further comprising a threaded insert fitting into said opening in said stem top surface.

5. The assembly of claim 1, wherein said stem has angled surfaces and said actuation arm has an underside surface of said first planar portion which mates with said angled surfaces.

6. The assembly of claim 1, wherein said stem slot is in an end surface of said stem.

7. The assembly of claim 1, wherein said device is a variable vane.

8. A vane arm assembly for a gas turbine engine comprising:
   an actuation arm comprising a first planar portion adjacent an angled portion that terminates in a second planar portion, said actuation arm having an actuation arm slot formed in an end surface adjacent and orthogonal to said first planar portion;
   a vane having an integrally formed stem to which said actuation arm is connected;
   said stem having a stem slot formed in said stem orthogonal to a stem top surface; and
   a tab washer having a tab washer first portion positioned over said first planar portion of said actuation arm, said tab washer having a tab washer second portion formed at a right angle to said tab washer first portion, a single tab extends from said tab washer second portion and inserts into said stem slot, said single tab being parallel to said tab washer first portion and perpendicular to said tab washer second portion.

9. The vane arm assembly of claim 8, wherein a bolt is used to join said actuation arm to said stem
   and said tab washer first portion includes an opening for receiving a portion of said bolt, said tab washer first portion having two spaced apart projection members abutting said first planar portion of said actuation arm, and a said tab washer first portion having an angled slot between said two spaced apart projection members.

10. The vane arm assembly of claim 8, further comprising said tab washer second portion having a width so that said tab washer second portion fits within said actuation slot.

11. The vane arm assembly of claim 8, wherein said stem has an opening in said stem top surface and further comprising a threaded insert fitting into said opening in said stem top surface.

12. The vane arm assembly of claim 8, wherein said stem has angled surfaces and said actuation arm has an underside surface of said first planar portion which mates with said angled surfaces.

13. The vane arm assembly of claim 8, wherein said stem slot is in an end surface of said stem.

14. The vane arm assembly of claim 8, further comprising a torque box assembly coupled to a ring assembly coupled to said actuation arm for changing the position of said vane.

* * * * *